United States Patent
Yamanaka (12) 
(10) Patent No.: US 6,965,496 B2
(45) Date of Patent: Nov. 15, 2005

(54) THIN FILM MAGNETIC HEAD, MAGNETIC HEAD DEVICE AND MAGNETIC RECORDING/REPRODUCING DEVICE

(75) Inventor: Noboru Yamanaka, Chuo-ku (JP)

(73) Assignee: TDK Corporation, Tokyo (JP)

( * ) Notice: Subject to any disclaimer, the term of this patent is extended or adjusted under 35 U.S.C. 154(b) by 118 days.

(21) Appl. No.: 10/667,337

(22) Filed: Sep. 23, 2003

(65) Prior Publication Data
US 2004/0066578 A1 Apr. 8, 2004

(30) Foreign Application Priority Data
Oct. 1, 2002 (JP) .............................. 2002-288743

(51) Int. Cl.[7] .............................................. G11B 5/147
(52) U.S. Cl. ..................................................... 360/126
(58) Field of Search .............................. 360/126, 317, 360/122

(56) References Cited

U.S. PATENT DOCUMENTS

| | | |
|---|---|---|
| 5,438,747 A | 8/1995 | Krounbi et al. |
| 5,452,164 A | 9/1995 | Cole et al. |
| 5,600,519 A | 2/1997 | Heim et al. |
| 6,069,775 A * | 5/2000 | Chang et al. ............... 360/126 |
| 6,141,857 A * | 11/2000 | Furusawa et al. ........ 29/603.15 |
| 6,317,289 B1 * | 11/2001 | Sasaki ......................... 360/126 |
| 6,515,824 B1 * | 2/2003 | Sato ............................ 360/126 |
| 6,525,904 B1 * | 2/2003 | Sasaki ......................... 360/126 |
| 6,563,779 B1 * | 5/2003 | McDonald et al. ......... 369/103 |
| 6,624,971 B1 * | 9/2003 | Sasaki ......................... 360/126 |
| 6,665,144 B2 * | 12/2003 | Matono ...................... 360/126 |
| 6,738,223 B2 * | 5/2004 | Sato et al. .................. 360/126 |
| 6,791,795 B2 * | 9/2004 | Ohtomo et al. ............. 360/126 |

* cited by examiner

Primary Examiner—Allen Cao
(74) Attorney, Agent, or Firm—Oliff & Berridge, PLC (57) ABSTRACT

In a first magnetic film, two notches are formed separately by a given distance, and a first pole piece is located between the notches. The first pole piece includes a uniform width portion. A second magnetic film includes a second pole piece. In the first pole piece, if the height of the uniform width portion is defined by "TH1", and the depth of the uniform width portion to a top surface from a base plane of the first magnetic film is defined by "ND1", and the thickness of said gap film is defined by "WG", the relations of TH1≧4WG and ND1≧4WG are satisfied.

16 Claims, 10 Drawing Sheets

THIN FILM MAGNETIC HEAD, MAGNETIC HEAD DEVICE AND MAGNETIC RECORDING/REPRODUCING DEVICE

BACKGROUND OF THE INVENTION

1. Field of the Invention

This invention relates to a thin film magnetic head, a magnetic head device and a magnetic recording/reproducing device.

2. Related Art Statement

A composite type magnetic head comprised of a writing element and a reading element with a giant magnetoresistive effective film (hereinafter, called as a "GMR film") is employed as a thin film magnetic head to be utilized in a magnetic disk drive device of a computer memory unit.

As the writing element is employed an inductive type electromagnetic conversion element, which is formed on the reading element. The inductive type electromagnetic conversion element is comprised of a bottom magnetic film, a top magnetic film, a coil film supported by a gap film, an insulating film and the like.

The forefronts of the bottom magnetic film and the top magnetic film are composed of a bottom pole piece and a top pole piece, respectively, which are opposed to each other via the gap film with a minute thickness and whereby writing process is carried out. The bottom magnetic film and the top magnetic film have their respective yoke portions which are magnetically connected at a back gap portion which is located at the rear side from the top pole piece and the bottom pole piece so that the magnetic films complete a magnetic circuit. The coil film is so formed as to wind the back gap portion.

As the GMR film constituting the reading element are typically exemplified a spin valve film (hereinafter, called as a "SV film") and a ferromagnetic tunnel junction film (hereinafter, called as a "TMR film"). The reading element made of the GMR film can realize reading performance of high resolution not depending on the relative velocity for a magnetic disk.

In order to realize high recording performance using such a thin film magnetic head as mentioned above, it is required that the amount of data to be stored in the magnetic disk per unit area (the surface recording density of the magnetic disk) is developed. The high surface recording density can be realized by enhancing the performance of the writing element, the performance of the magnetic recording medium such as the magnetic disk, and the high frequency performance of the writing circuit.

With the writing element, if the gap length between the pole pieces is decreased, the surface recording density can be developed. The decrease of the gap length is restricted on the decrease in magnetic recording intensity between the pole pieces.

With the magnetic disk, if the data track number is increased, the surface recording density can be developed. The track number of the magnetic disk is represented by "TPI" (Track Per Inch). The TPI performance of the writing element can be developed by downsizing the dimension of the writing head to define the data track width. The dimension of the writing head is usually called as a "head track width".

In order to realize high recording density in HDDs to be employed in computers, the track width is narrowed, e.g., to 0.4 $\mu$m and 0.3 $\mu$m, particularly 0.2 $\mu$m at present. With the narrowed track width, it becomes important how to reduce the influence of the magnetic field leaked from the both edges of the pole pieces in the track width direction for the magnetic disk, which is called as "side fringe", in addition to the overwrite performance.

In order to realize the overwrite performance, the pole pieces are made of a high saturated magnetic flux density material and the configurations of the pole pieces are optimized. In order to reduce the side infringe in the track width direction, such a technique is proposed as to match the width of the bottom pole piece to the width of the top pole piece by means of ion beam milling to form the same track width from the bottom pole piece and the top pole piece (cf., Patent Publications No. 1 and No. 2).

For the same sake, such a technique is proposed as to form tapered portions between the zero throat points and the enlarged portions of the bottom magnetic film and the top magnetic film (cf., Patent Publication No. 3).

For the same sake, such a technique is proposed as to set the width of the top yoke portion larger than the width of the top pole piece to project both edges of the top yoke portion from both edges of the top pole piece in the width direction (cf., Patent Publication No. 4)

With the above-mentioned conventional technique, however, if the track width is narrowed to 0.3 $\mu$m or below, the adjacent tracks may be erased, so that the side fringe can not be eliminated sufficiently.

Patent Publication No. 1: Japanese Patent Application Laid-open No. 7-262519

Patent Publication No. 2: Japanese Patent Application Laid-open No. 7-225917

Patent Publication No. 3: U.S. Pat. No. 5,600,519

Patent Publication No. 4: U.S. Pat. No. 5,452,164

SUMMARY OF THE INVENTION

It is an object of the present invention to provide a thin film magnetic head, a magnetic head device and a magnetic recording/reproducing device wherein side fringe can be eliminated sufficiently when the track width is narrowed sufficiently, thereby to remove the recording blur therein.

For achieving the above object, four types of thin film magnetic heads are proposed as follows.

1. First Thin Film Magnetic Head

A first thin film magnetic head according to the present invention includes at least one writing element. The writing element includes a first magnetic film, a second magnetic film, a gap film and a coil film. The first magnetic film includes two notches which are separated on the same plane level and to be opposite to a magnetic recording medium.

The first magnetic film also includes a first pole piece which includes a uniform width portion which defines a uniform track width as viewed backward from a forefront of the first pole piece to be opposite to the magnetic recording medium by the distance between the two notches. The second magnetic film includes a second pole piece and is adjacent to the first pole piece via the gap film. The coil film excites a thin film magnetic circuit comprised of the first magnetic film, the second magnetic film and the gap film.

In the first pole piece, if the height of the uniform width portion is defined by "TH1", and the depth of the uniform width portion to a top surface from a base plane of the first magnetic film is defined by "ND1", and the thickness of the gap film is defined by "WG", the relations of TH1≧4WG and ND1≧4WG are satisfied.

In the first thin film magnetic head, the second pole piece of the second magnetic film is adjacent to the first pole piece of the first magnetic film via the gap film. The coil film excites the thin film magnetic circuit comprised of the first magnetic film, the second magnetic film and the gap film. Therefore, when a writing current is supplied to the coil film to excite the thin film magnetic circuit and thus, to generate a writing magnetic field at the writing gap formed by the first pole piece, the second pole piece and the gap film, magnetic recording process can be carried out using the writing magnetic field.

The first magnetic film of the writing element includes the two notches and the first pole piece. The two notches are separated on the same plane level. The first pole piece defines the track width by the distance between the two notches. Therefore, the track width can be narrowed sufficiently depending on the distance between the two notches, so that the TPI performance of the writing element can be enhanced. Also, the side fringe such as recording blur due to the leaked magnetic field from both edges of the writing element in the track width direction can be reduced.

The first pole piece includes the uniform width portion as viewed backward from the forefront of the first pole piece to be opposite to the magnetic recording medium, and the uniform width portion defines the track width. Then, if the height of the uniform width portion is defined by "TH1", and the depth of the uniform width portion to the top surface from the base plane of the first magnetic film is defined by "ND1", and the thickness of the gap film is defined by "WG", the relations of $TH1 \geq 4WG$ and $ND1 \geq 4WG$ are satisfied.

Among the above-mentioned relations, if the first relation of $TH1 \geq 4WG$ is satisfied, the leaked magnetic field (edge magnetic field) from the both edges of the writing element can be reduced small, e.g., to 2.5 kOe or below. Therefore, the side fringe can be reduced sufficiently even though the track width is narrowed to 0.2 μm.

If the second relation of $ND1 \geq 4WG$ is satisfied, the edge magnetic field can be reduced small, e.g., to 2.5 kOe or below. Therefore, the side fringe can be reduced sufficiently even though the track width is narrowed to 0.2 μm.

2. Second Thin Film Magnetic Head

In a second thin film magnetic head according to the present invention, attention is paid to the second pole piece of the second magnetic film. In this case, the first magnetic film may be formed in another configuration. The second pole piece includes a uniform width portion which defines a uniform track width as viewed backward from the forefront of the second pole piece to be opposite to the magnetic recording medium. Then, if the height of the uniform width portion is defined by "TH2" and the thickness of the gap film is defined by "WG", the relation of $TH2 \geq 4WG$ is satisfied. In this case, the edge magnetic field can be reduced small, e.g., to 2.5 (kOe) or below. Therefore, even though the track width is narrowed to 0.2 μm or below, the side fringe can be reduced sufficiently.

In the second thin film magnetic head, it is desired that if the depth to a bottom surface adjacent to the gap film from a top surface of the second pole piece is defined by "ND2", the relation of $ND2 \geq 4WG$ is satisfied. In this case, since the edge magnetic field can be reduced small to 2.5 (kOe) or below, the side fringe can be reduced sufficiently even though the track width is narrowed to 0.2 μm or below.

The first thin film magnetic head and the second thin film magnetic head may be combined with each other. In this case, the relations of $TH1 \geq 4WG$ and $ND1 \geq 4WG$ relating to the first thin film magnetic head and the relations of $TH2 \geq 4WG$ and if desired, $ND2 \geq 4WG$ relating to the second thin film magnetic head are satisfied, so that the functions relating to the first thin film magnetic head and the second thin film magnetic head as mentioned above can be realized.

3. Third Thin Film Magnetic Head

In a third thin film magnetic head according to the present invention, the first magnetic film includes the first pole piece on a base plane, and does not include the notches as in the first thin film magnetic head. The first pole piece includes a uniform width portion which defines a uniform track width as viewed backward from the forefront of the first pole piece to be opposite to the magnetic recording medium. Then, if the height of the uniform width portion is defined by "TH1", and the depth of the uniform width portion to a top surface of the first pole piece from a base plane of the first magnetic film is defined by "ND1", and the thickness of the gap film is defined by "WG", the relations of $TH1 \geq 4WG$ and $ND1 \geq 4WG$ are satisfied.

Therefore, the same function as the first thin film magnetic head can be realized because the same relations are satisfied.

4. Fourth Thin Film Magnetic Head

In a fourth thin film magnetic head according to the present invention, the first magnetic film includes the first pole piece on a base plane, and does not include notches as in the first thin film magnetic head, as mentioned in the third thin film magnetic head. In the fourth thin film magnetic head, however, attention is paid to the second pole piece.

The second pole piece includes a uniform width portion which defines a uniform track width as viewed backward from the forefront of the second pole piece to be opposite to the magnetic recording medium. Then, if the height of the uniform width portion is defined by "TH2" and the thickness of the gap film is defined by "WG", the relation of $TH2 \geq 4WG$ is satisfied, as mentioned in the second thin film magnetic head, so that the fourth thin film magnetic head can realize the same function as the second thin film magnetic head.

In the fourth thin film magnetic head, it is desired that if the depth to a bottom surface adjacent to the gap film from a top surface of the second pole piece is defined by "ND2", the relation of $ND2 \geq 4WG$ is satisfied. In this case, since the edge magnetic field can be reduced small to 2.5 (kOe) or below, the side fringe can be reduced sufficiently even though the track width is narrowed to 0.2 μm or below.

The third thin film magnetic head and the fourth thin film magnetic head may be combined with each other. In this case, the relations of $TH1 \geq 4WG$ and $ND1 \geq 4WG$ relating to the third thin film magnetic head and the relations of $TH2 \geq 4WG$ and if desired, $ND2 \geq 4WG$ relating to the fourth thin film magnetic head are satisfied, so that the functions relating to the third thin film magnetic head and the fourth thin film magnetic head as mentioned above can be realized.

This invention also relates to a magnetic head device comprised of the above-mentioned thin film magnetic head and a head supporting device. Moreover, this invention relates to a magnetic recording/reproducing device comprised of the magnetic head device and the magnetic recording medium.

Other objects, configurations and advantages will be described in detail hereinafter, with reference to the accompanying drawing. It is to be understood that the invention is not intended to be limited to the following specific embodiments.

BRIEF DESCRIPTION OF THE DRAWINGS

For a better understanding of this invention, reference is made to the attached drawings, wherein.

DETAILED DESCRIPTION OF PREFERRED EMBODIMENTS

1. First Thin Film Magnetic Head

Figure 1:
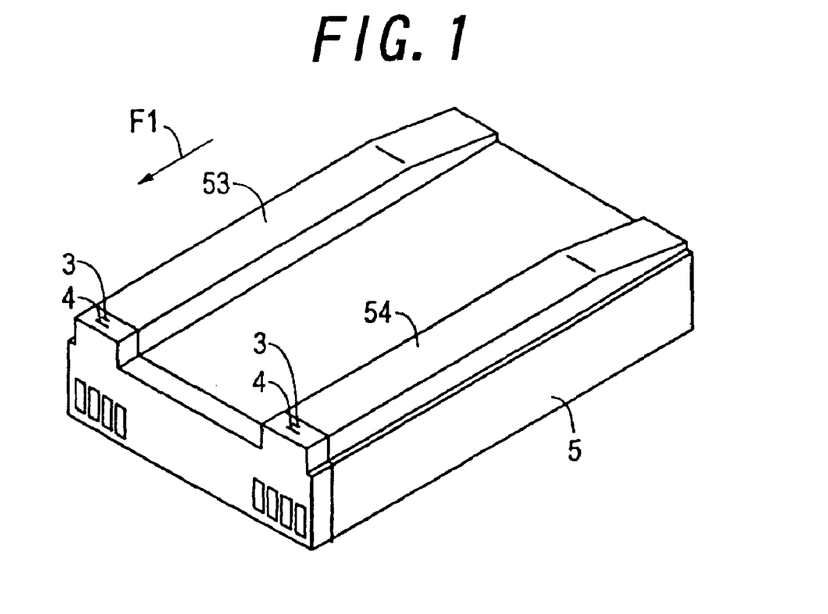
FIG. 1 is a perspective view showing a thin film magnetic head according to the present invention.
Figure 2:
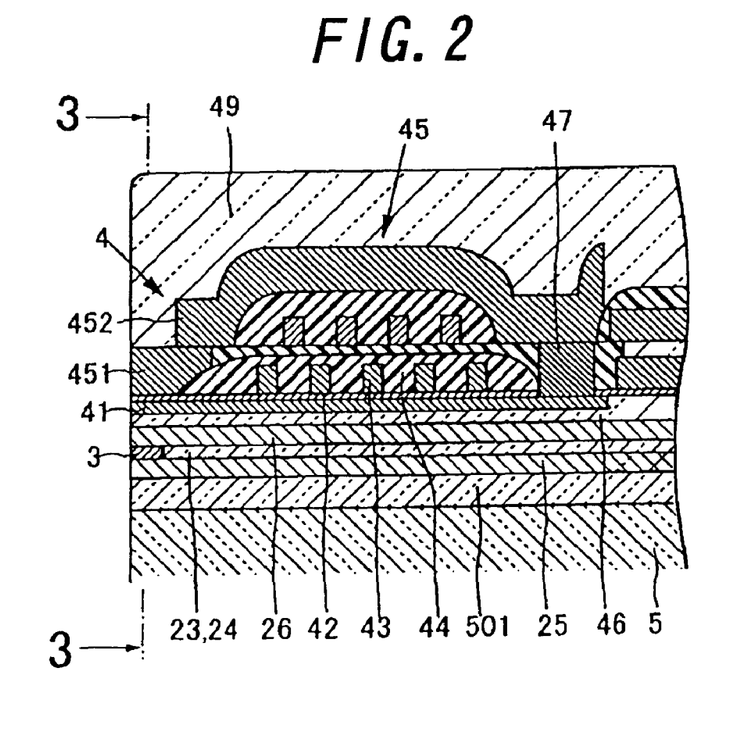
FIG. 2 is an enlarged cross sectional view showing the thin film magnetic head in FIG. 1.
Figure 3:
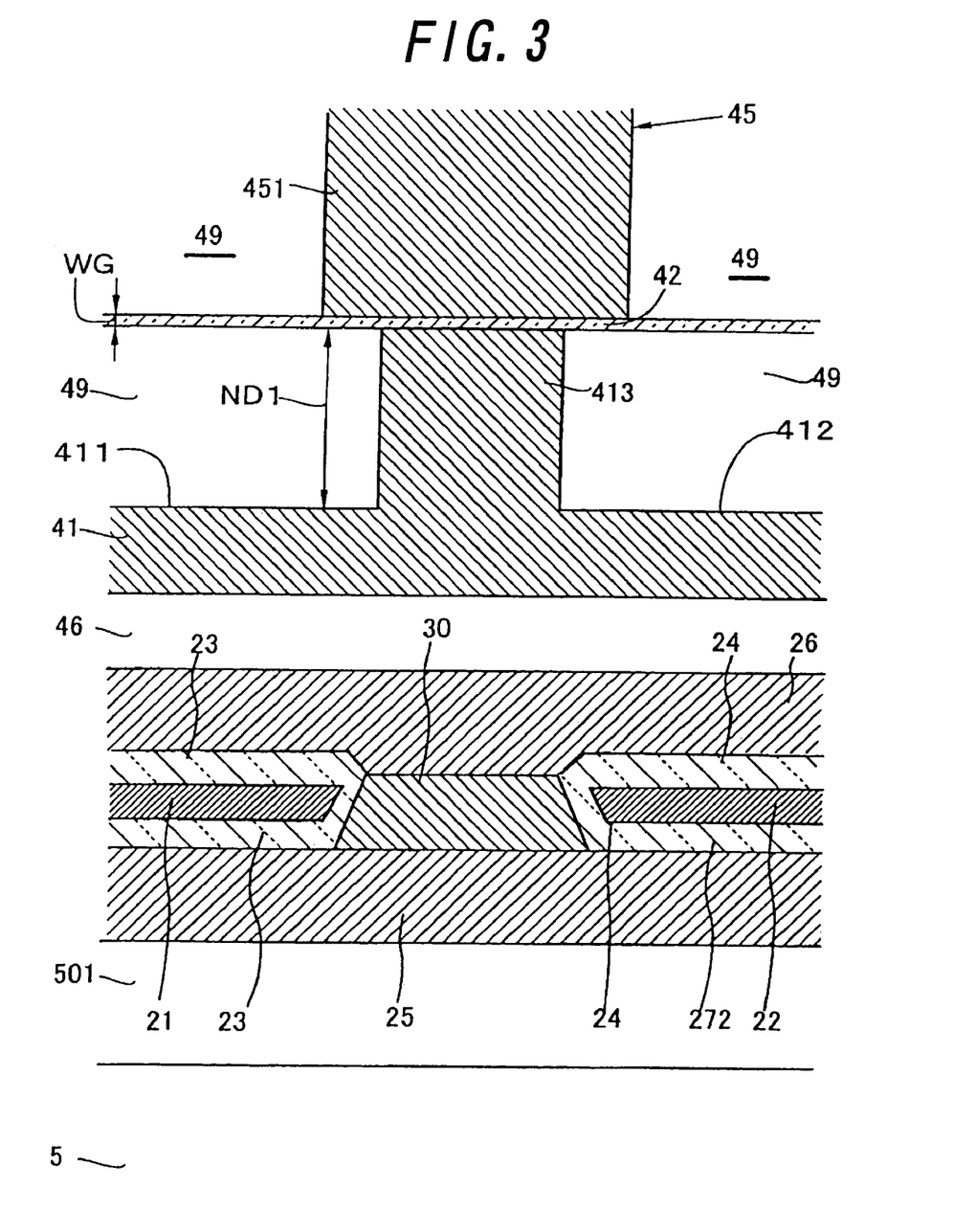
FIG. 3 is an enlarged cross sectional view showing the thin film magnetic head in FIG. 2, taken on line "3—3"
Figure 4:
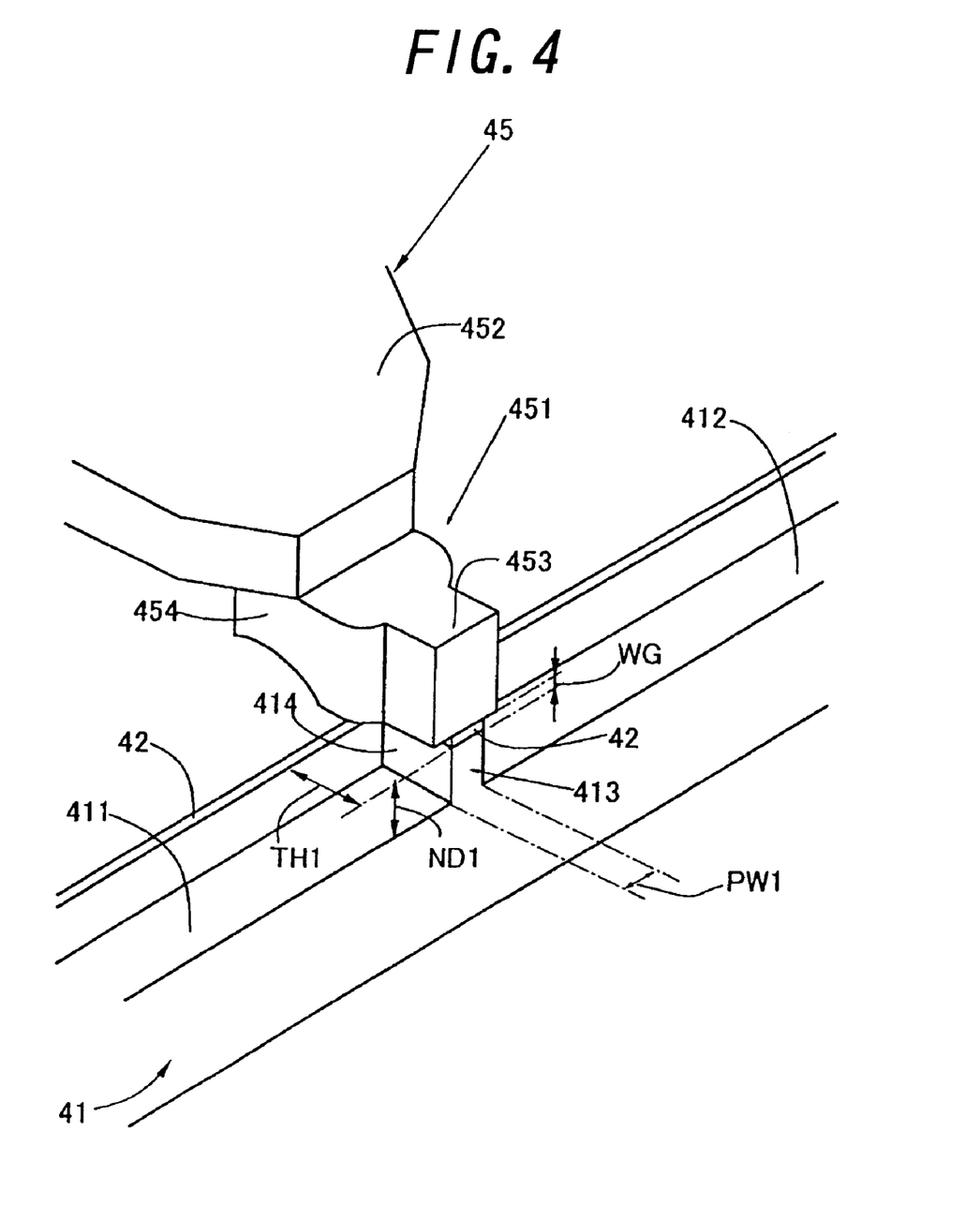
FIG. 4 is an enlarged perspective view showing the pole portion of the thin film magnetic head in FIGS. 1–3.

FIG. 1 is a perspective view showing a thin film magnetic head according to the present invention, and FIG. 2 is an enlarged cross sectional view showing the thin film magnetic head in FIG. 1. FIG. 3 is an enlarged cross sectional view showing the thin film magnetic head in FIG. 2, taken on line "3—3", and FIG. 4 is an enlarged perspective view showing the pole portion of the thin film magnetic head in FIGS. 1–3. In these figures, some components are overdrawn. In this embodiment, a composite type thin film magnetic head, comprised of a writing element 4 and a reading element 3, is shown. The writing element 4 and the reading element 3 are formed on a base 5 to be employed as a slider, and the forefronts of the elements 3 and 4 are located at the air bearing surfaces (hereinafter, called as "ABS"s) 53 and 54 of the thin film magnetic head, respectively, which are opposite to a magnetic recording medium. The arrow F1 designates a rotative direction of the magnetic recording medium (air flowing direction).

The writing element 4 is comprised of an inductive type thin film magnetic conversion element, which is formed on the reading element 3. The writing element 4 includes a first magnetic film 41, a gap film 42, a second magnetic film 45 and a coil film 43. The first and second magnetic films 41 and 45 may be made of permalloy.

The first magnetic film 41 includes two notch portions 411 and 412, and a first pole piece 413. The notch portions 411 and 412 are separated from each other by a distance PW1 on the same plane level. The first magnetic film 41 is formed in plane except the notches 411 and 412.

The first pole piece 41 is defined by the distance PW1 located between the notches 411 and 412. In this embodiment, the distance PW1 constitutes the writing track width, so will be called as a "track width PW1", hereinafter The notches 411 and 412 are formed precisely by means of ion milling, reactive ion etching, etc.

The track width PW1 is set uniform along the height TH1 as viewed backward from the forefront of the first pole piece 413 to be opposite to a magnetic recording medium. The uniform portion of the track width PW1 along the height TH1 will be called as a "uniform width portion 414".

One surface of the gap film 42 is adjacent to the first pole piece 413. The gap film 42 may be made of metallic oxide such as $Al_2O_3$ and $SiO_2$, or nitride such as AlN, BN and SiN. The gap film 42 may be also made of conductive non-magnetic material such as Au, Cu and NiP.

The second magnetic film 45 includes a second pole piece 451 which is adjacent to the other surface of the gap film 42. In this embodiment, the second magnetic film 45 includes a yoke piece 452, of which one edge is continuously combined with the second pole piece 451 and of which the other edge is elongated as viewed backward from the forefront of the second pole piece 451 to be opposite to the magnetic recording medium and magnetically combined with the first magnetic film 41 at a backward junction 47.

The first pole piece 413, the second pole piece 451 and the gap film 42 are located on the same plane level to constitute a medium-opposing surface.

The coil film 43 excites the thin film magnetic circuit comprised of the first magnetic film 41, the second magnetic film 45 and the gap film 42. The coil film 43 is supported by an insulating film 44 and wound around the backward junction 47. In this embodiment, although the coil film 43 is formed in two layer, it may be in single layer or in multilayer. The coil film 43 may be made of conductive material containing Cu as its main component.

The second magnetic film 45 includes a yoke piece 452, of which one edge is continuously combined with the second pole piece 451 and of which the other edge is elongated backward from the front edge constituting the medium-opposing surface and magnetically combined with the first magnetic film 41 at the backward junction 47. In this embodiment, in this way, the pole pieces and the yoke piece are separated to constitute a stitch type thin film magnetic head. Reference numeral "49" designates a protective film to cover the resultant thin film magnetic head assembly entirely.

The reading element 3 is preferably made of a GMR film. In this embodiment, the reading element 3 is composed of a GMR film 30, magnetic domain-controlling films 21 and 22, a first magnetic shielding film 25 and a second magnetic shielding film 26. The GMR film includes a free layer to respond to an external magnetic field, and the magnetic domain-controlling films 21 and 22 are positioned at both sides of the GMR film 30 to control the magnetic domains of the free layer.

In this embodiment, the magnetic domain-controlling films 21 and 22 are made of hard magnetic film (magnet) such as CoCrPt film and CoPt film or anti-ferromagnetic film. The magnetic domain-controlling films 21 and 22 are embedded in insulating layers 23 and 24.

A first magnetic shielding film 25 is so formed as to be adjacent to one surface of the GMR film 30 in the thickness direction, and a second magnetic shielding film 26 is so formed as to be adjacent to the other surface of the GMR film 30 in the thickness direction. The first shielding film 25 is supported by an insulating film 501 provided on the base (slider) 5.

The GMR film 30 includes a first electrode film 25 and a second electrode film 26 for supplying a sense current thereto. The first electrode film 25 is adjacent to one surface of the GMR film 30 in the thick direction, and the second electrode film 26 is adjacent to the other surface of the GMR film 30 in the thickness direction. The GMR film 30 can be made of a ferromagnetic tunnel junction film (TMR film) or a CPP-type spin valve film (SV film) to flow a sense current perpendicular thereto.

In this embodiment, the first electrode film 25 also serves as the first magnetic shielding film 25 and the second electrode film 26 also serves as the second magnetic shielding film 26. Therefore, the resultant shield gap in the thin film magnetic head can be minimized to realize high density recording. In the use of both the electrode film and the shielding film, the films 25 and 26 may be made of CoFe, NiFe, CoNiFe and the like. The second electrode film 26 is adjacent to the first magnetic film 41 via an insulating film 46.

In the first thin film magnetic head of the present invention, as described in this embodiment, the gap film 42 is disposed between the first pole piece 413 and the second pole piece 451, and the coil film 43 excites the thin film magnetic circuit comprised of the first magnetic film 41, the second magnetic film 45 and the gap film 42. Therefore, when a writing current is supplied to the coil film 43 to excite the thin film magnetic circuit and thus, to generate a writing magnetic field at the writing gap formed by the first pole piece 413, the second pole piece 451 and the gap film 42, magnetic recording process can be carried out using the writing magnetic field.

As mentioned above, the first magnetic film 41 composing the writing element 4 includes the notches 411 and 412, and the first pole piece 413. Then, the notches 411 and 412 are separated by the distance PW1 on the same plane level. Therefore, the track width PW1 can be narrowed sufficiently depending on the distance PW1 between the notches 411 and 412, so that the TPI performance of the writing element 4 can be enhanced. Also, the side fringe such as recording blur due to the leaked magnetic field from both edges of the writing element 4 in the track width direction can be reduced.

The first thin film magnetic head of the present invention is particularly characterized that the dimension of the pole piece 413 is restricted. In the first thin film magnetic head, it is required that the height TH1 of the uniform width portion 414 and the depth ND1 to the top surface from the base plane of the first magnetic film 41 in the first pole piece 413 and the thickness of the gap film 42 satisfy the following relations:

$$TH1 \geq 4WG, \ ND1 \geq 4WG$$

The technical meaning of the above relations will be described hereinafter, with reference to FIGS. 5–8.

Figure 5:
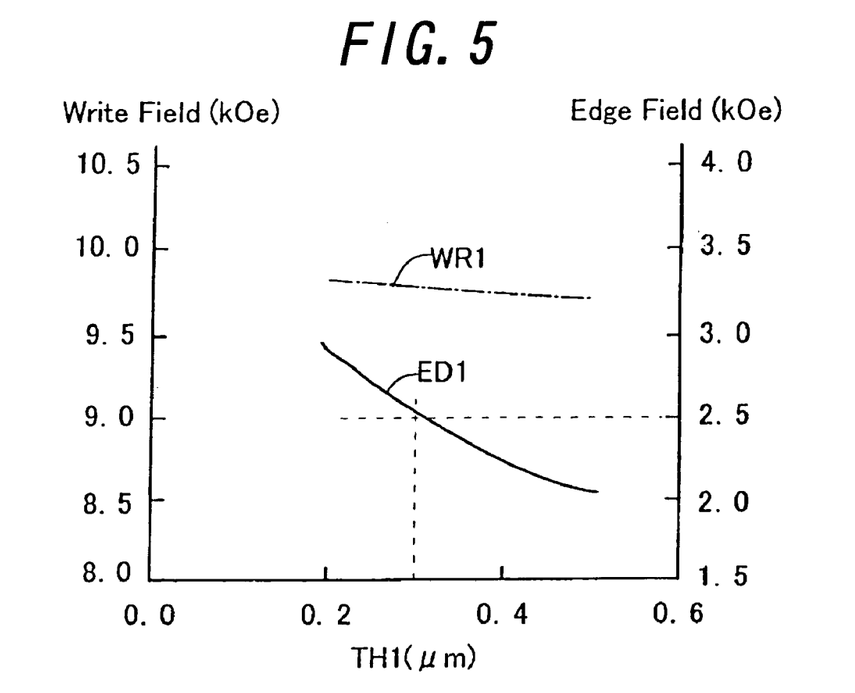
FIG. 5 is a graph showing the relations between the height "TH1" of the first pole piece 413 and the Write field, the Edge Field.

FIG. 5 is a graph showing the relations between the height "TH1" of the first pole piece 413 and the writing magnetic field (Write Field), the edge magnetic field (Edge Field). The abscissa axis designates the height TH1 ($\mu$m), and the left ordinate axis designates the Write Field (kOe), and the right ordinate axis designates the Edge Field (kOe). The thickness WG of the gap film 42 is set to 0.1 $\mu$m. The reference "WR1" corresponds to the Write Field, and the reference "ED1" corresponds to the Edge Field.

It is reported that the side fringe can be reduced at the Edge Field of 2.5 kOe or below. In this point of view, it is turned out from FIG. 5 that when the height TH1 is set to 0.3 $\mu$m or over, the Edge Field can be decreased to 2.5 kOe or below and thus, the side fringe can be reduced sufficiently.

Figure 6:
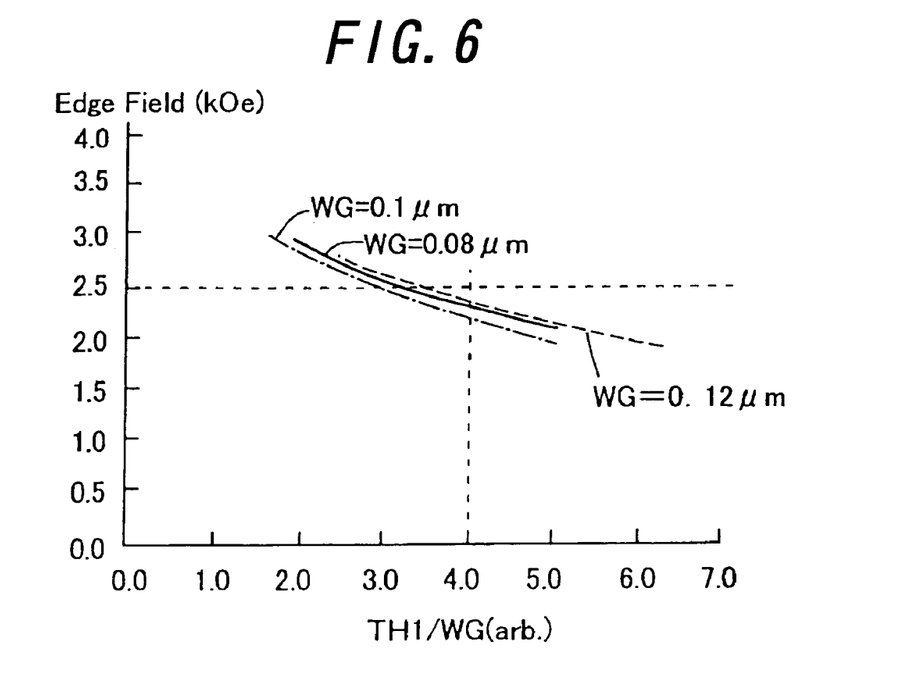
FIG. 6 is a graph showing the relation between the height "TH1" of the first pole piece 413 and the Edge Field per the ratio (TH1/WG)(WG: the thickness of the gap film)

FIG. 6 is a graph showing the relation between the height TH1 of the first pole piece 413 and the Edge Field per the ratio (TH1/WG) of the height TH1 for the thickness WG of the gap film 42. In this figure, the abscissa axis designates the ratio (TH1/WG), and the ordinate axis designates the Edge Field (kOe). The illustrated three curves correspond to the Edge Fields at the thickness WG of the gap film 42=0.08 $\mu$m, 0.1 $\mu$m and 0.12 $\mu$m, respectively.

As is apparent from FIG. 6, when the relation of TH1$\geq$4WG is satisfied, the Edge Field can be reduced small to 2.5 kOe or below even though the thickness WG of the gap film 42 is varied. The Edge Field depends on the thickness WG of the gap film 42, not on the track width. Therefore, even though the track width is narrowed to 0.2 $\mu$m or below, the side fringe can be reduced.

Figure 7:
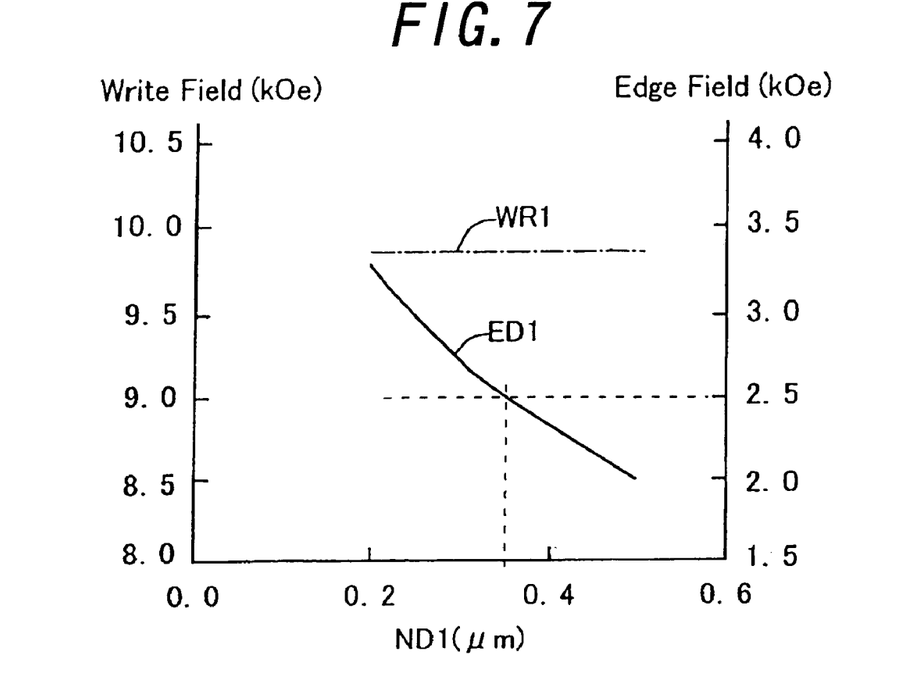
FIG. 7 is a graph showing the relations between the depth "ND1" of the first pole piece 413 and the Write Field, the Edge Field.

FIG. 7 is a graph showing the relations between the depth "ND1" of the first pole piece 413 and the Write Field, the Edge Field. The abscissa axis designates the depth ND1 ($\mu$m), and the left ordinate axis designates the Write Field (kOe), and the right ordinate axis designates the Edge Field (kOe). The thickness WG of the gap film 42 is set to 0.1 $\mu$m. Reference "WR1" corresponds to the Write Field and reference "ED1" corresponds to the Edge Field.

As mentioned above, it is reported that the side fringe can be reduced at the Edge Field of 2.5 kOe or below. In this point of view, it is turned out from FIG. 7 that when the depth ND1 is set to 0.35 $\mu$m or over, the Edge Field can be decreased to 2.5 kOe or below and thus, the side fringe can be reduced sufficiently.

Figure 8:
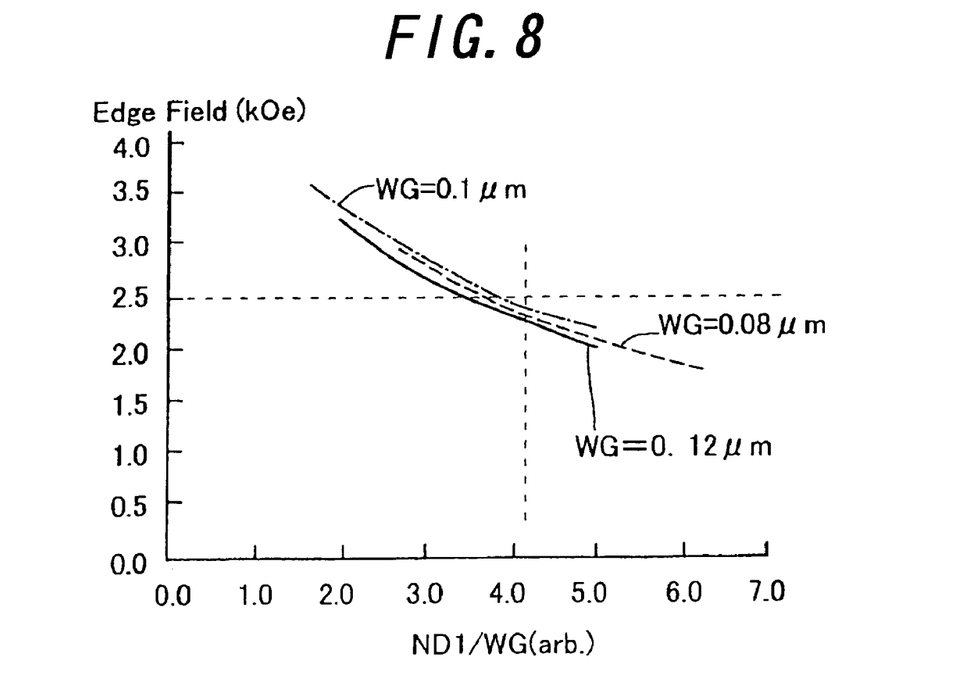
FIG. 8 is a graph showing the relation between the depth "ND1" of the first pole piece 413 and the Edge Field per the ratio (ND1/WG)(WG: the thickness of the gap film)

FIG. 8 is a graph showing the relation between the depth "ND1" of the first pole piece 413 and the Edge Field per the ratio (ND1/WG) of the depth ND1 for the thickness WG of the gap film 42. In this figure, the abscissa axis designates the ratio (ND1/WG), and the ordinate axis designates the Edge Field (kOe). The illustrated three curves correspond to the Edge Fields at the thickness WG of the gap film 42=0.08 $\mu$m, 0.1 $\mu$m and 0.12 $\mu$m, respectively.

As is apparent from FIG. 8, when the relation of ND1$\geq$4WG is satisfied, the Edge Field can be reduced small to 2.5 kOe or below even though the thickness WG of the gap film 42 is varied. The Edge Field depends on the thickness WG of the gap film 42, not on the track width. Therefore, even though the track width is narrowed to 0.2 $\mu$m or below, the side fringe can be reduced.

2. Second Thin Film Magnetic Head

Figure 9:
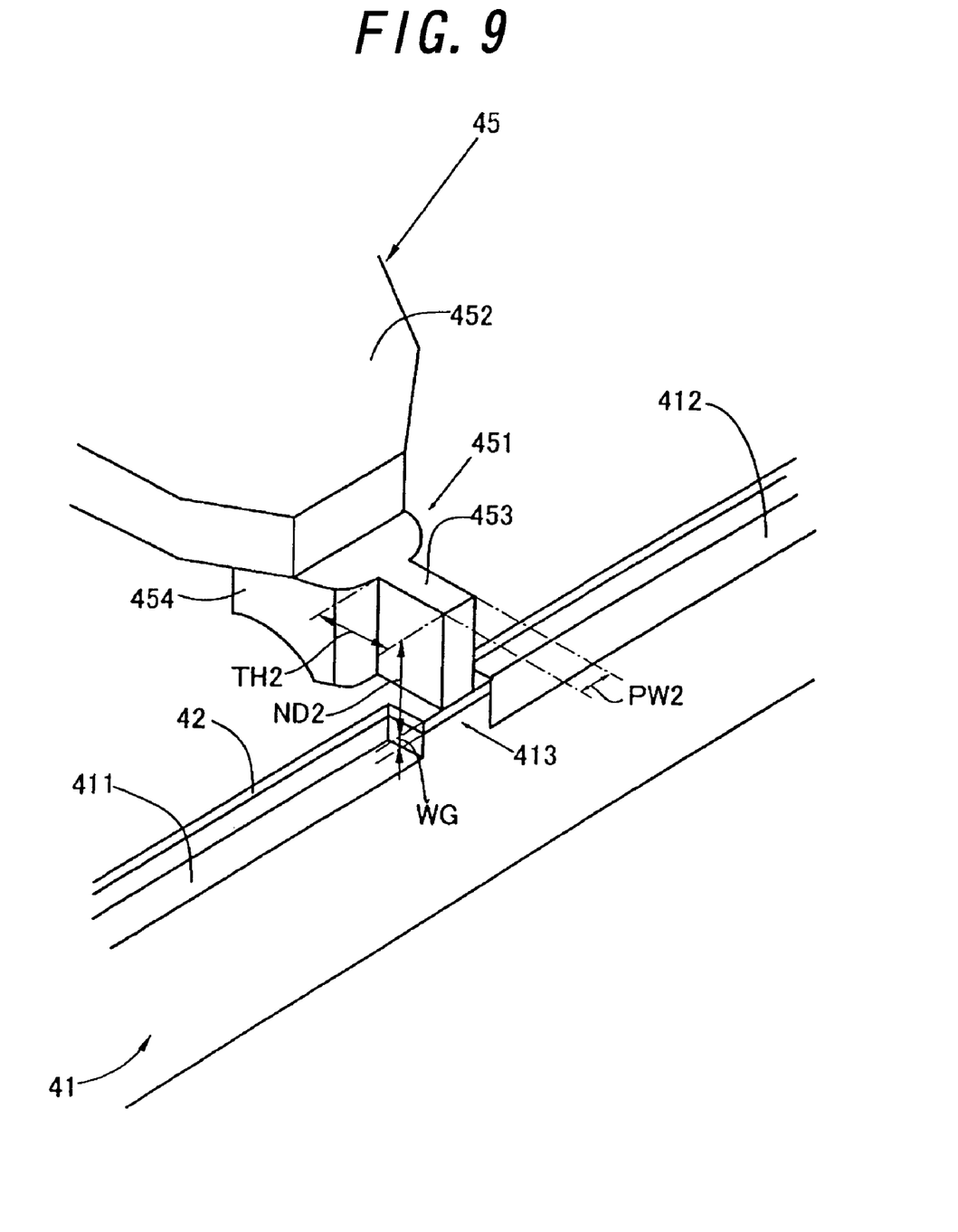
FIG. 9 is an enlarged perspective view showing the pole portion of another thin film magnetic head according to the present invention.

FIG. 9 is an enlarged perspective view showing the pole portion of a second thin film magnetic head according to the present invention. In the second thin film magnetic head, attention is paid to the second pole piece 451 of the second magnetic film 45. The second pole piece 451 is adjacent to the first pole piece 413 via the gap film 4, and includes a uniform width portion 453 where the track width PW2 is set uniform along the height TH2 as viewed backward from the forefront of the second pole piece 451 to be opposite to the magnetic recording medium. An enlarged width portion 454 is provided backward from the uniform width portion 453, and the yoke piece 452 of the second pole piece 451 is combined with the enlarged width portion 454.

In the second thin film magnetic head of the present invention, it is required that the relation of TH2≧4WG is satisfied for the height TH2 of the uniform width portion and the thickness WG of the gap film 42. In this case, the Edge Field can be reduced small to 2.5 (kOe) or below. This condition can be easily anticipated from FIGS. 5 and 6. Therefore, even though the track width is narrowed to 0.2 μm or below, the side fringe can be reduced sufficiently.

In the second thin film magnetic head, it is desired that the relation of ND2≧4WG is satisfied for the depth ND2 which is defined by the distance between the top surface and the bottom surface of the second pole piece 453. The bottom surface of the second pole piece 453 is adjacent to the gap film 42. In this case, the Edge Field can be reduced small to 2.5 (kOe) or below. This condition can be easily anticipated from FIGS. 7 and 8.

Figure 10:
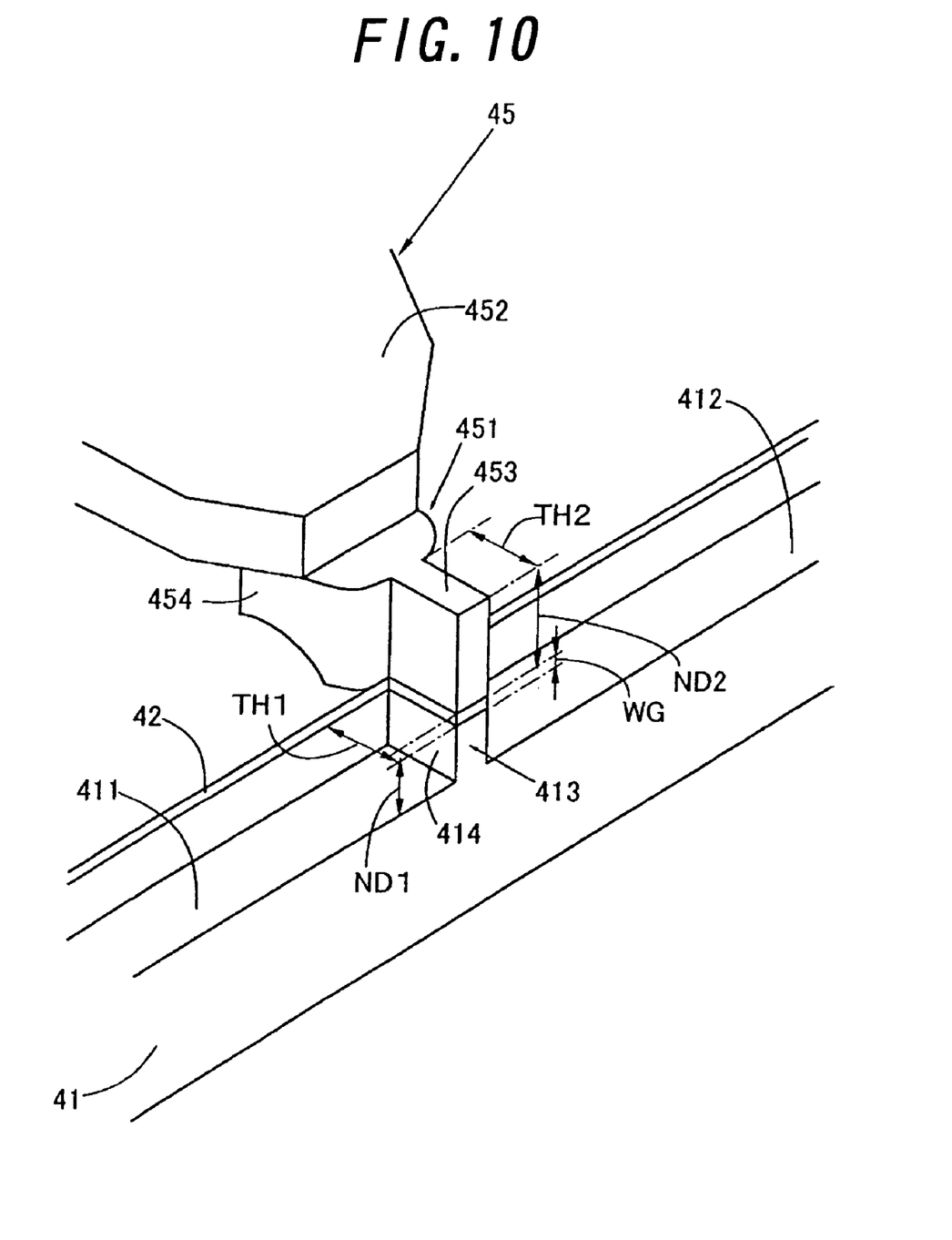
FIG. 10 is an enlarged perspective view showing the pole portion of still another thin film magnetic head according to the present invention.

The first thin film magnetic head and the second thin film magnetic head may be combined with each other. FIG. 10 illustrates the combined thin film magnetic head. In this case, the relations of TH1≧4WG and ND1≧4WG relating to the first thin film magnetic head and the relations of TH2≧4WG and if desired, ND2≧4WG relating to the second thin film magnetic head are satisfied, so that the functions relating to the first thin film magnetic head and the second thin film magnetic head as mentioned above can be realized.

3. Third Thin Film Magnetic Head

Figure 11:
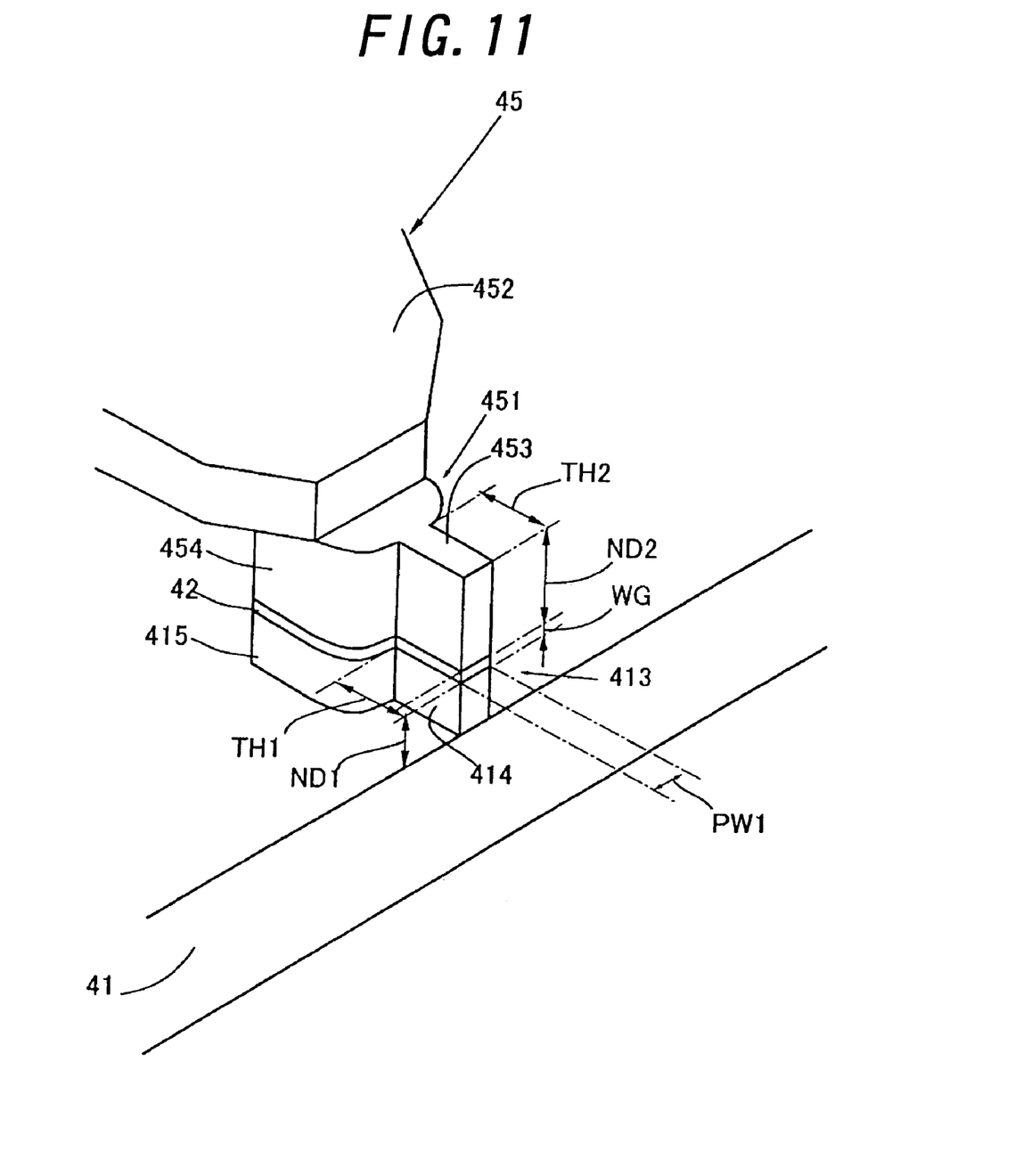
FIG. 11 is an enlarged perspective view showing the pole portion of a further thin film magnetic head according to the present invention.

FIG. 11 is an enlarged perspective view showing the pole portion of a third thin film magnetic head according to the present invention. In the third thin film magnetic head, the first magnetic film 41 includes the first pole piece 413 on the plane surface, and does not include notches as described in the first thin film magnetic head. The first pole piece 413 includes the uniform width portion 414 along the height TH1 as viewed backward from the forefront of the first pole piece 413 to be opposite to the magnetic recording medium. Then, it is required that the relations of TH1≧4WG and ND1≧4WG are satisfied for the height TH1 and the depth ND1 of the uniform width portion 414, and the thickness WG of the gap film 42.

In the third thin film magnetic head, since the above-mentioned relations are satisfied, the same function as the first thin film magnetic head can be realized.

The first pole piece 413 may be formed on the first magnetic film 41, or may be incorporated in the first magnetic film 41 as mentioned above. In this embodiment, the enlarged width portion 415 is continuously combined with the uniform width portion 414 of the first pole piece 413.

4. Fourth Thin Film Magnetic Head

FIG. 11 is also an enlarged perspective view showing the pole portion of a fourth thin film magnetic head according to the present invention. In the fourth thin film magnetic head, the first magnetic film 41 includes the first pole piece 413 on the plane surface, and does not include notches as described in the first thin film magnetic head, as mentioned in the third thin film magnetic head. In the fourth thin film magnetic head, however, attention is paid to the second pole piece 451.

The second pole piece 451 includes a uniform width portion 453 where the track width PW2 is set uniform along the height TH2 as viewed backward from the forefront of the second pole piece 451 to be opposite to the magnetic recording medium. In the fourth thin film magnetic head of the present invention, it is required that the relation of TH2≧4WG is satisfied for the height TH2 of the uniform width portion and the thickness WG of the gap film 42, as mentioned in the second thin film magnetic head, so that the fourth thin film magnetic head can realize the same function as the second thin film magnetic head.

In this case, it is desired that the relation of ND2≧4WG is satisfied for the depth ND2 of the uniform width portion 454 and the thickness WG of the gap film 42. In this case, the Edge Field can be reduced small to 2.5 (kOe) or below, and thus, the side fringe can be reduced sufficiently.

The third thin film magnetic head and the fourth thin film magnetic head may be combined with each other. FIG. 11 illustrates the combined thin film magnetic head. In this case, the relations of TH1≧4WG and ND1≧4WG relating to the third thin film magnetic head and the relations of TH2≧4WG and if desired, ND2≧4WG relating to the fourth thin film magnetic head are satisfied, so that the functions relating to the third thin film magnetic head and the fourth thin film magnetic head as mentioned above can be realized.

5. Magnetic Head Device

Figure 12:
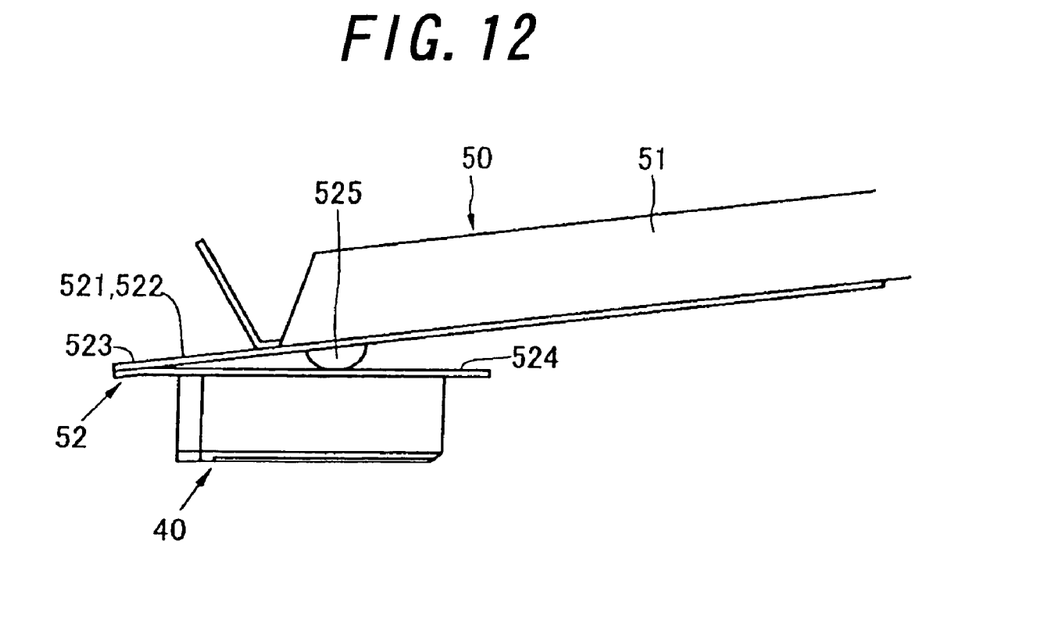
FIG. 12 is an elevational view showing a magnetic head device according to the present invention.
Figure 13:
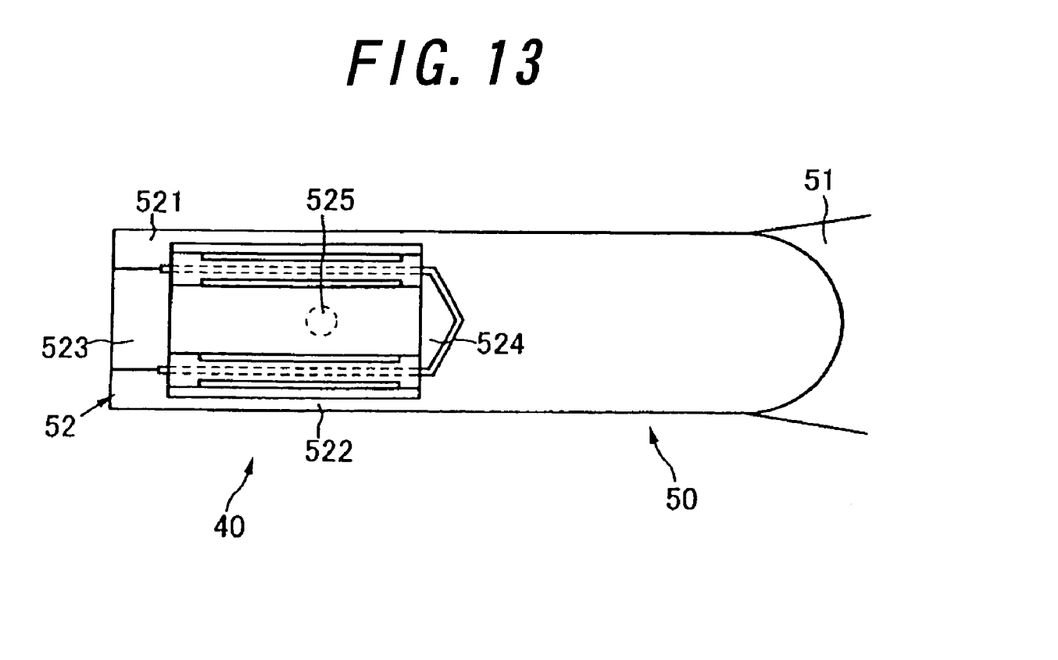
FIG. 13 is a bottom plan view of the magnetic head device in FIG. 12.

FIG. 12 is an elevational view showing a magnetic head device according to the present invention, and FIG. 13 is a bottom plan view of the magnetic head device in FIG. 12. The illustrated magnetic head device includes a thin film magnetic head 40 as shown in FIGS. 1–4, 9–11 and a head supporting device 50. The head supporting device 50 is comprised of a supporter 51 made of a metallic plate and a flexibler 52 made of a metallic plate provided on the free edge of the supporter 51 in its longitudinal direction. The thin film magnetic head 40 is attached on the lower surface of the flexibler 52.

The flexibler 52 has two outerframes 521 and 522 substantially parallel to the supporter 51 in its longitudinal direction, a lateral frame 523 to join the outerframes 521 and 522 in the remote portion thereof from the supporter 51, and a tongue shaped member 524, of which the forefront is free, extending substantially parallel to the outerframes 521 and 522 from the almost central portion of the lateral frame 523. The other edge of the tongue shaped member 524 is attached to the free edge of the supporter 51 by means of welding or the like.

On the lower surface of the supporter 51 is provided a hemispheric loading convex portion 525, which conducts a load to the tongue shaped member 524 from the free edge of the supporter 51.

The thin film magnetic head 40 is attached to the lower surface of the tongue shaped member 524, and may be pitch-driven and roll-driven.

The present invention is not limited to the above-mentioned magnetic head device, but applicable for any kind of magnetic head device proposed previously or to be proposed in future. For example, the supporter 51 and the tongue shaped member 524 may be combined with a flexible polymer wiring plate such as TAB tape. Also, a magnetic head device of gimbal structure well known may be employed.

6. Magnetic Recording/reproducing Device

Figure 14:
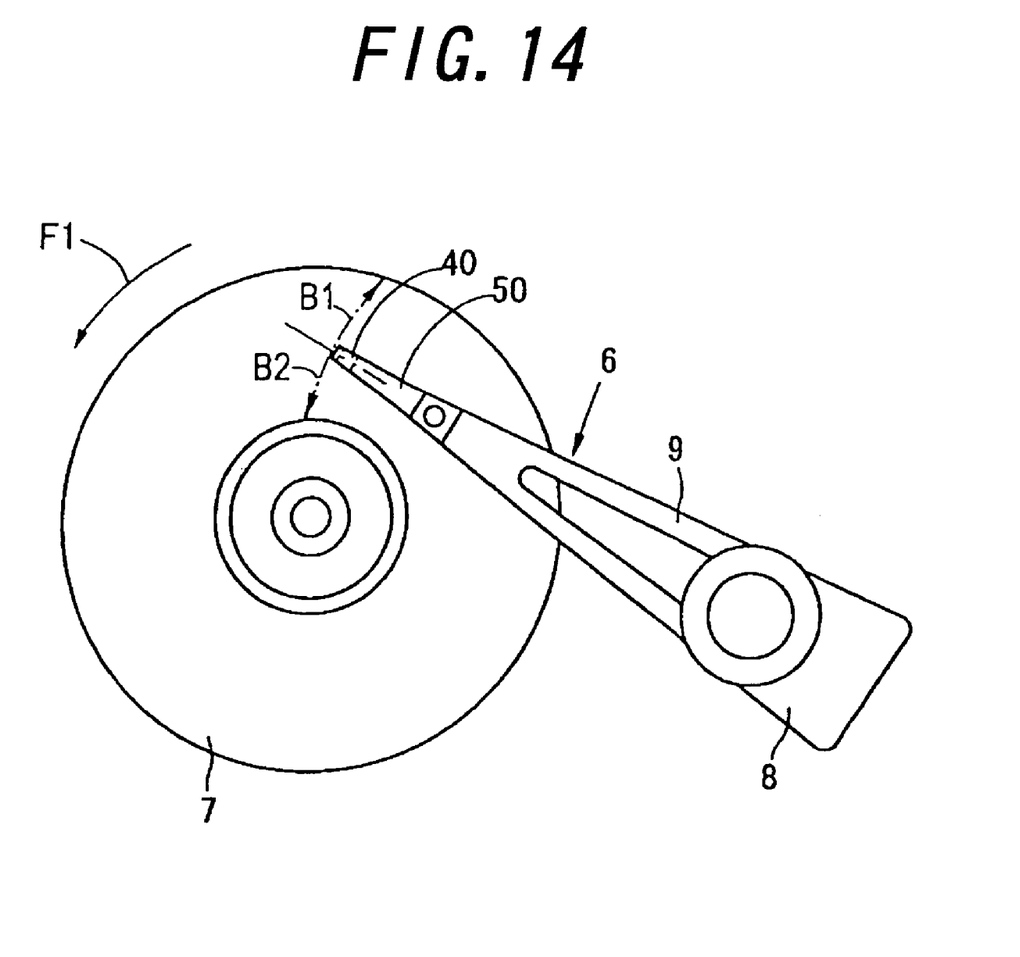
FIG. 14 is a plan view showing a magnetic recording/reproducing device according to the present invention.

FIG. 14 is a plan view showing a magnetic recording/reproducing device according to the present invention. The illustrated magnetic recording/reproducing device includes a magnetic head device 6 as illustrated in FIGS. 12 and 13, a position determining device 8 and a magnetic disk 7. The position determining device 8 is driven on the principle of rotary actuator system, and supports the other edge of the head supporting device 50.

In this embodiment, the magnetic disk 7 is rotated at high velocity in the direction designated by the arrow "F1" by means of not shown rotation driving mechanism with cooperated with the magnetic head device 6.

The thin film magnetic head 40 is driven in the direction designated by the arrow "B1" or "B2" by the head supporting device 50, an arm 9 and the position determining device 8, thereby to perform magnetic recording and reproducing for the magnetic disk 7.

In this case, the side fringe from the thin film magnetic head 40 can be reduced, and thus, the recording blur due to the leaked magnetic field for the magnetic disk 7 can be eliminated.

Although the present invention was described in detail with reference to the above examples, this invention is not limited to the above disclosure and every kind of variation and modification may be made without departing from the scope of the present invention.

As mentioned above, according to the present invention, a thin film magnetic head, a magnetic head device and a magnetic recording/reproducing device can be provided, which can eliminate side fringe sufficiently when the track width is narrowed sufficiently, thereby to remove the recording blur therein.

What is claimed is:

1. A thin film magnetic head comprising at least one writing element,
   said writing element including a first magnetic film, a second magnetic film, a gap film and a coil film,
   said first magnetic film including two notches which are separated on the same plane level and to be opposite to a magnetic recording medium and a first pole piece which includes a uniform width portion which defines a uniform track width as viewed backward from a forefront of said first pole piece to be opposite to said magnetic recording medium by the distance between said two notches,
   said second magnetic film including a second pole piece and being adjacent to said first pole piece via said gap film,
   said coil film exciting a thin film magnetic circuit comprised of said first magnetic film, said second magnetic film and said gap film,
   wherein in said first pole piece, if the height of said uniform width portion is defined by "TH1", and the depth of said uniform width portion to a top surface from a base plane of said first magnetic film is defined by "ND1", and the thickness of said gap film is defined by "WG", the relations of TH1≧4WG and ND1≧4WG are satisfied.

2. A thin film magnetic head comprising at least one writing element,
   said writing element including a first magnetic film, a second magnetic film, a gap film and a coil film,
   said first magnetic film including two notches which are separated on the same plane level and to be opposite to a magnetic recording medium and a first pole piece which is located between said two notches,
   said second magnetic film including a second pole piece which is adjacent to said first pole piece via said gap film and includes a uniform width portion which defines a uniform track width as viewed backward from a forefront of said second pole piece to be opposite to said magnetic recording medium
   said coil film exciting a thin film magnetic circuit comprised of said first magnetic film, said second magnetic film and said gap film,
   wherein in said second pole piece, if the height of said uniform width portion is defined by "TH2" and the thickness of said gap film is defined by "WG", the relation of TH2≧4WG is satisfied.

3. A thin film magnetic head comprising at least one writing element,
   said writing element including a first magnetic film, a second magnetic film, a gap film and a coil film,
   said first magnetic film including, on a base plane, a first pole piece which includes a uniform width portion which defines a uniform track width as viewed backward from the forefront of said first pole piece to be opposite to a magnetic recording medium,
   said second magnetic film including a second pole piece which is adjacent to said first pole piece via said gap film,
   said coil film exciting a thin film magnetic circuit comprised of said first magnetic film, said second magnetic film and said gap film,
   wherein in said first pole piece, if the height of said uniform width portion is defined by "TH1", and the depth of said uniform width portion to a top surface of said first pole piece from a base plane of said first magnetic film is defined by "ND1", and the thickness of said gap film is defined by "WG", the relations of TH1≧4WG and ND1≧4WG are satisfied.

4. A thin film magnetic head comprising at least one writing element,
   said writing element including a first magnetic film, a second magnetic film, a gap film and a coil film,
   said first magnetic film including a first pole piece on a base plane,
   said second magnetic film including a second pole piece which is adjacent to said first pole piece via said gap film and includes a uniform width portion which defines a uniform track width as viewed backward from a forefront of said second pole piece to be opposite to a magnetic recording medium
   said coil film exciting a thin film magnetic circuit comprised of said first magnetic film, said second magnetic film and said gap film,
   wherein in said second pole piece, if the height of said uniform width portion is defined by "TH2" and the thickness of said gap film is defined by "WG", the relation of TH2≧4WG is satisfied.

5. The thin film magnetic head as defined in claim 1, wherein said second pole piece includes a uniform width portion as viewed backward from a forefront of said second pole piece to be opposite to said magnetic recording medium, and if the height of said uniform width portion elongating backward from said forefront of said second pole piece is defined by "TH2", the relation of TH2≧4WG is satisfied.

6. The thin film magnetic head as defined in claim 5, wherein in said second pole piece, if the depth to a bottom surface adjacent to said gap film from a top surface of said second pole piece is defined by "ND2", the relation of ND2≧4WG is satisfied.

7. The thin film magnetic head as defined in claim 3, wherein said second pole piece includes a uniform width portion as viewed backward from a forefront of said second pole piece to be opposite to said magnetic recording medium, and if the height of said uniform width portion elongating backward from said forefront of said second pole piece is defined by "TH2", the relation of TH2≧4WG is satisfied.

8. The thin film magnetic head as defined in claim 7, wherein in said second pole piece, if the depth to a bottom surface adjacent to said gap film from a top surface of said second pole piece is defined by "ND2", the relation of ND2≧4WG is satisfied.

9. The thin film magnetic head as defined in claim 2, wherein in said second pole piece, if the depth to a bottom surface adjacent to said gap film from a top surface of said second pole piece is defined by "ND2", the relation of ND2≧4WG is satisfied.

10. The thin film magnetic head as defined in claim 4, wherein in said second pole piece, if the depth to a bottom surface adjacent to said gap film from a top surface of said second pole piece is defined by "ND2", the relation of ND2≧4WG is satisfied.

11. The thin film magnetic head as defined in claim 1, further comprising a reading element comprised of a first shielding film, a second shielding film and a magnetoresistive effective film which is located between said first shielding film and said second shielding film.

12. The thin film magnetic head as defined in claim 11, wherein said magnetoresistive effective film is made of a giant magnetoresistive effective film.

13. A magnetic head device comprising a thin film magnetic head as defined in claim 1 and a head supporting device to support said thin film magnetic head.

14. A magnetic head device comprising a thin film magnetic head as defined in claim 11 and a head supporting device to support said thin film magnetic head.

15. A magnetic recording/reproducing device comprising a magnetic head device as defined in claim 13 and a magnetic recording medium to be magnetically written and read with cooperated with said magnetic head device.

16. A magnetic recording/reproducing device comprising a magnetic head device as defined in claim 14 and a magnetic recording medium to be magnetically written and read with cooperated with said magnetic head device.

* * * * *